June 26, 1923.
F. A. CRITZ, JR.
ROLLER BEARING
Filed Nov. 4, 1921
1,459,974
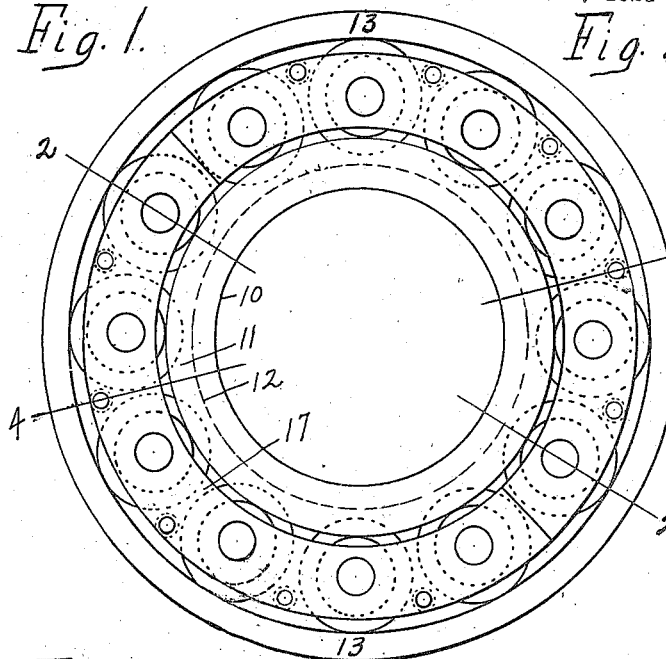
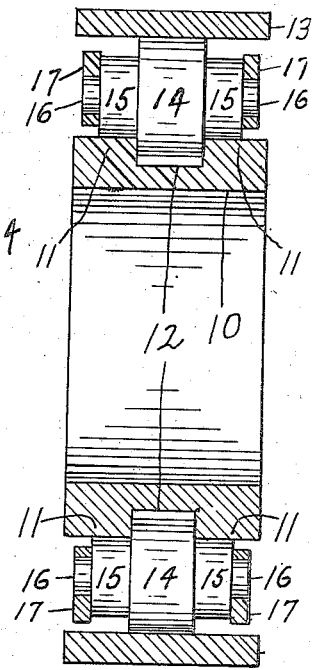
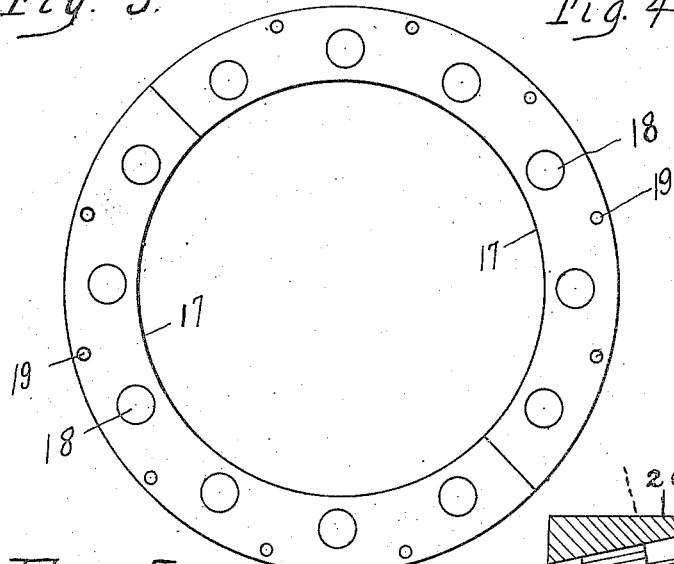
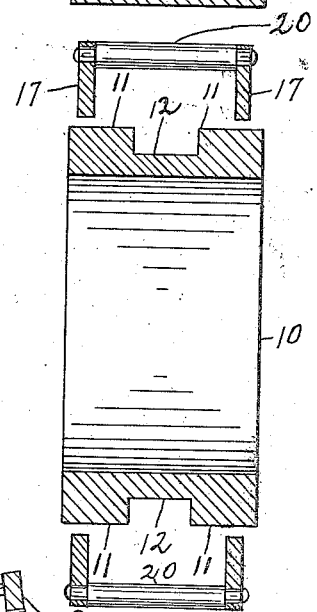
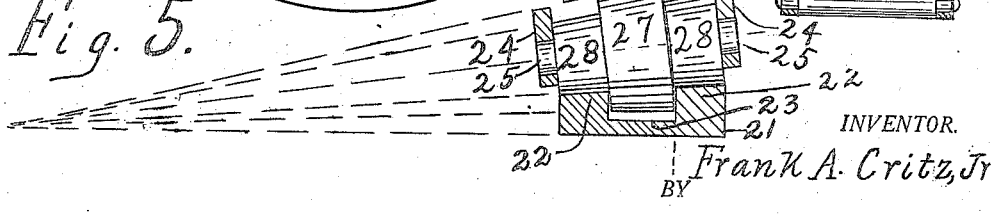
INVENTOR.
Frank A. Critz, Jr.
BY
ATTORNEYS.

Patented June 26, 1923.

1,459,974

UNITED STATES PATENT OFFICE.

FRANK ARCHELAUS CRITZ, JR., OF WEST POINT, MISSISSIPPI.

ROLLER BEARING.

Application filed November 4, 1921. Serial No. 512,779.

*To all whom it may concern:*

Be it known that I, FRANK ARCHELAUS CRITZ, Jr., a citizen of the United States, residing at West Point, in the county of Clay and State of Mississippi, have invented certain new and useful Improvements in Roller Bearings, of which the following is a specification.

My invention relates to improvements in roller bearings, and refers particularly to the types of bearings known as cylinder and cone roller bearings; and the object of my invention is to provide rollers with three bearing surfaces, so that two of the bearing surfaces will engage an inner sleeve, the other bearing surface engaging an outer sleeve.

Another object of my invention is the provision of a roller bearing of the character specified, which will be composed of comparatively few but very substantial parts; and which will reduce the friction of the bearing to a minimum; and which may be easily and cheaply manufactured.

To attain the objects stated and such others as inhere to an invention of this character, my roller bearing consists of certain novel features of construction and combination of parts substantially as shown, described and claimed herein, it being understood that I reserve the right to make any change in the construction which falls within the scope of the claims.

In order that the construction in detail and the operation of my roller bearing may be more clearly understood and its many advantages appreciated, I have shown in the accompanying drawings a roller bearing constructed according to my invention and in said drawings:

Figure 1 represents a side elevation of the complete roller bearing embodying my invention.

Figure 2 represents a sectional view of the roller bearing on the line 2—2 of Figure 1.

Figure 3 is a side elevation of the cage carrying the ends of the rollers.

Figure 4 is a sectional view through the line 4—4 of Figure 1, omitting the outer sleeve 13.

Figure 5 is a detail sectional view of the bearing, when a cone shaped roller is used instead of the cylinder shaped rollers shown in the other views.

The same numerals being used in the various views to represent identical parts, the bearing as shown by the several drawings is adapted to support with as little friction as possible any revolving element.

An inner sleeve 10 may be of any desired width. It has two circumferential bearing surfaces 11, and between these surfaces is a groove 12, which receives the collar of the roller 14.

The outer sleeve 13 engages the collar 14 of the roller, only, and is made of any width desired.

The roller comprises a central collar 14, the two adjacent bearing surfaces 15 of smaller diameter than the collar, and the trunnions 16 that are journalled in a cage of two flat rings 17, and it will be seen that the surfaces 15 bear directly upon the surfaces 11 of the inner sleeve 10, and the collar 14 bears directly on the inner surface of the outer sleeve 13, running in the groove 12 as in a raceway; but the collar does not make contact with the bottom of the groove 12.

The diameter of the surfaces 15 of the rollers is to the diameter of the ribs 11 of the inner sleeve as the diameter of the collar 14 of the rollers is to the inside diameter the outer sleeve 13, so that the respective surfaces 15 in their engagement with the surfaces 11 and the surface 14 in its engagement with the inner surface of 13 produces a perfect rotation of the roller without any slipping of said surfaces in contact, and thus reducing the friction and wear of the bearing.

The rings 17 practically enclose the rollers within the movable and stationary members and have holes 18 for the trunnions 16 and perforations 19 for the stay rods 20 that unite the rings and form the cage into a substantial structure to carry the rollers. These rings may be divided diametrically as shown in Figures 1 and 3.

In Figure 5 is shown a bearing commonly known as a cone roller bearing and which is adapted not only to carry the load applied perpendicularly to the axis of rotation; but also adapted to care for the end thrust on the bearing.

The inner sleeve 21 with beveled bearing surfaces 22 engages bearing surfaces 28 of the roller, with groove 23 to receive the collar of the roller 27. The outer sleeve 26 engages only the collar 27 of the roller, which roller has trunnions 25, which are journalled in cage rings 24, which cage rings are held in the proper position by stay rods as shown in Figure 4.

The proportions of the parts of this thrust bearing are the same as above described.

What I claim as new is:

1. In roller bearings, the combination of rollers having a collar in the center and reduced bearing surfaces on each side of the collar, the reduced bearing surfaces and the collar having the form of a frustum of a cone, an outer sleeve to engage the collar, an inner sleeve with groove to receive the collar and ribs to engage said reduced bearing surfaces, side rings, the rollers having trunnions journalled in said rings, stay rods extending between said rollers and engaging said rings to hold the rings in position, and the reduced bearing surfaces of the rollers being diametrically proportioned to the inner sleeve as the collars are to the inner surface of the outer sleeve.

2. In roller bearings, the combination of rollers each having a collar in the center with reduced adjacent bearing surfaces at each side, trunnions at each end of the roller, engaging cage rings having openings receiving said trunnions and rotatably mounting said rollers, the collar and adjacent reduced bearing surfaces of the roller having a cone shape, and engaging corresponding beveled surfaces of inner and outer sleeves, the diameters of the reduced adjacent bearings, at the circular lines where said bearings join said collar, being to the diameters of the collar through said circular lines, respectively, as the diameters of the inner sleeve at said circular lines of juncture are to the diameters of the inner surface of the outer sleeve, at the points of contact with each edge of said collar, respectively.

3. A roller bearing constituting a thrust bearing comprising a shaft, an internal ring journalled on said shaft, said internal ring having its outer periphery tapered and formed with an intermediate cut out portion thereby forming a pair of tapered roller races, an external ring having its inner surface tapered, a plurality of conical rollers having their end portions of smaller diameter than their middle portions, said end portions adapted to roll on the races of the internal ring, and their middle portions arranged to contact with the external ring and to extend into the cut out portion of the internal ring, the tapers of the race rings and the enlarged and reduced portions of each roller all terminating in a common apex.

In testimony whereof I hereunto affix my signature.

FRANK ARCHELAUS CRITZ, Jr.